Figure 3:
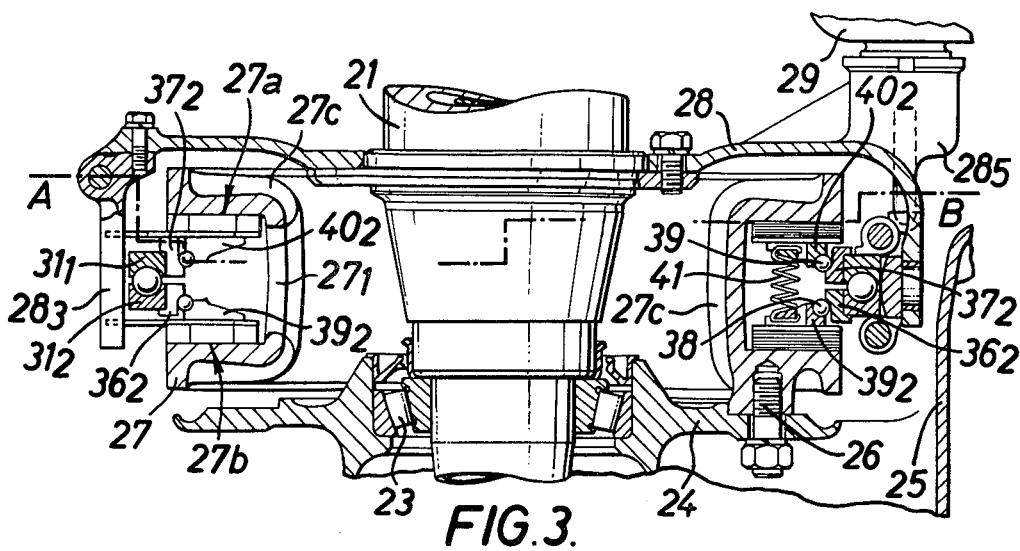

United States Patent [19]
Klaue

[11] 3,942,610
[45] Mar. 9, 1976

[54] SPREADING DISC BRAKE WITH REMOVABLE SHOES

[76] Inventor: Hermann Klaue, Tour d'Ivoire 24 e, 1820 Montreux, Switzerland

[22] Filed: Apr. 2, 1974

[21] Appl. No.: 457,261

Related U.S. Application Data

[60] Division of Ser. No. 288,287, Sept. 12, 1972, Pat. No. 3,885,650, which is a continuation-in-part of Ser. No. 73,566, Sept. 18, 1970, abandoned.

[30] Foreign Application Priority Data

| Dec. 2, 1969 | Germany | 1960286 |
| Dec. 27, 1969 | Germany | 1965171 |
| Dec. 27, 1969 | Germany | 1965170 |

[52] U.S. Cl. ............ 188/71.4; 188/71.8; 188/73.6; 188/264 G; 188/366; 192/70; 192/70.13; 192/85 AB; 192/111 A
[51] Int. Cl.² .................................. F16D 55/10
[58] Field of Search ....... 188/73.6, 71.4, 71.8, 72.5, 188/196 P, 264 G, 366, 170; 192/70, 85 AB, 111 A, 70.13, DIG. 1

[56] References Cited
UNITED STATES PATENTS

| 2,778,451 | 1/1957 | Friedman | 188/73.6 |
| 2,874,807 | 2/1959 | Hahn | 188/71.4 |
| 3,075,620 | 1/1963 | Roe | 188/196 P X |
| 3,185,256 | 5/1965 | Schilling | 188/366 X |
| 3,377,076 | 4/1968 | Burnett | 188/71.8 |
| 3,421,601 | 1/1969 | Klaue | 192/70 |

FOREIGN PATENTS OR APPLICATIONS

| 1,014,857 | 12/1955 | Germany | 188/71.4 |
| 1,235,498 | 5/1960 | France | 188/71.4 |
| 1,084,230 | 9/1967 | United Kingdom | 188/70 R |

*Primary Examiner*—George E. A. Halvosa
*Attorney, Agent, or Firm*—Stevens, Davis, Miller & Mosher

[57] ABSTRACT

A brake assembly having a brake housing which has an annular member enclosing an annular gap of channel-like cross-section open at its radially exterior side is provided with at least one pair of segmental brake shoes. Annular actuating rings are disposed in the gap between the brake shoes and hydraulically actuated members are associated with the actuating rings to move them against the brake shoes and press the brake shoes against the braking surface. The hydraulic actuating members may be L-shaped slidable members which enclose the sealed annular space into which hydraulic fluid is introduced into the groove, a pair of hydraulic cylinders having pistons which move actuating rings associated with the brake shoes or a ring cylinder and ring piston assembly.

7 Claims, 32 Drawing Figures

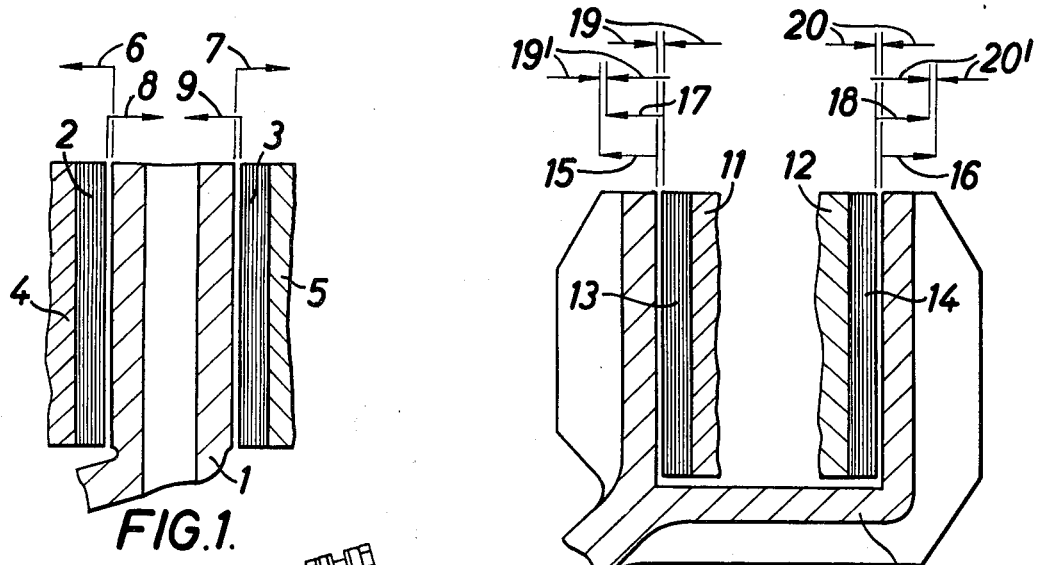
FIG.1.
FIG.2.
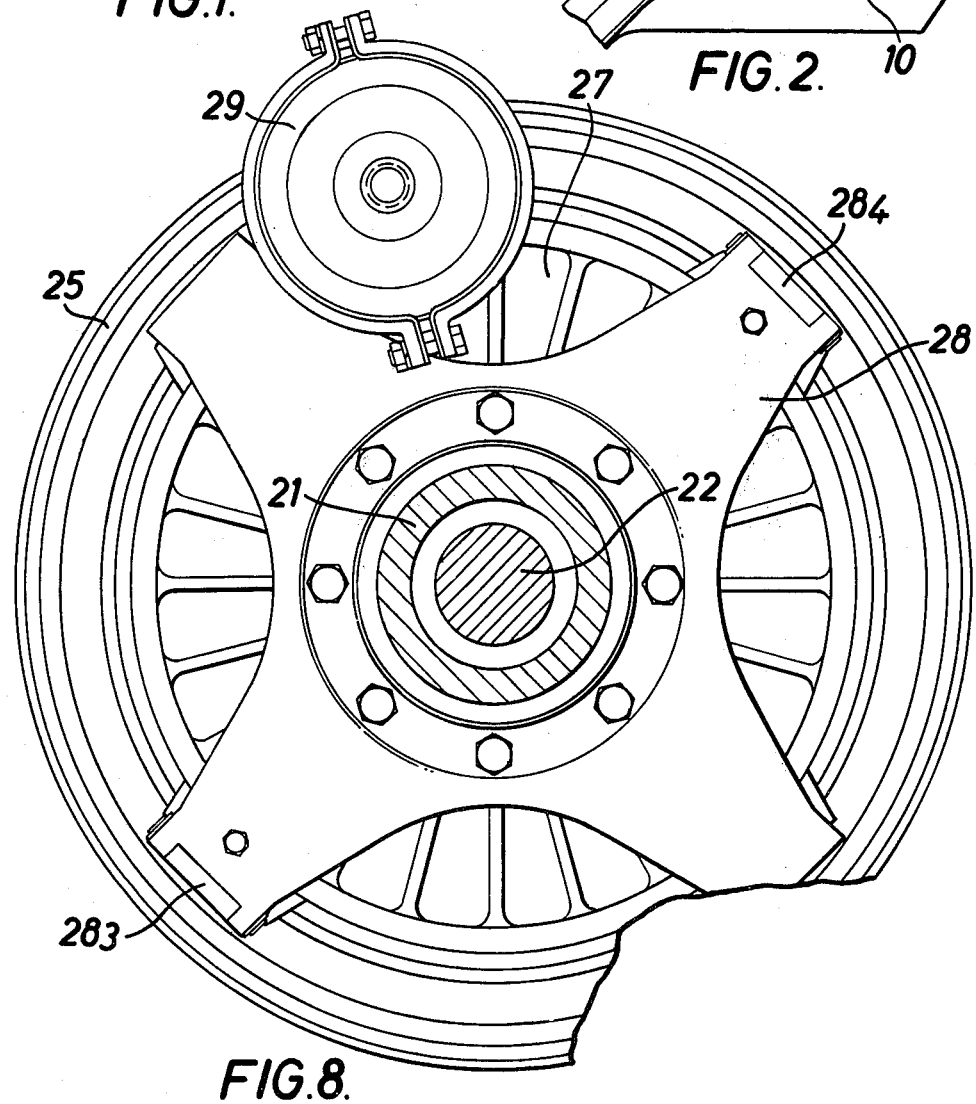
FIG.8.

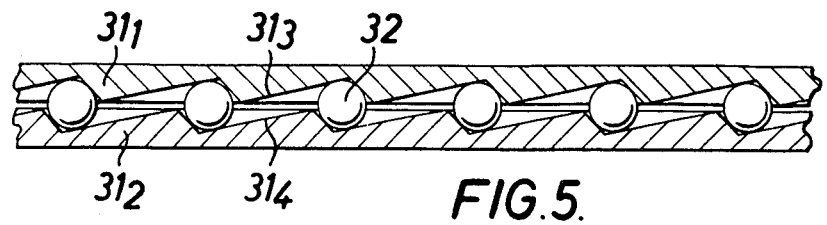
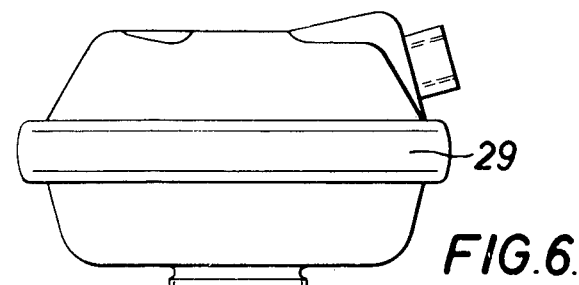
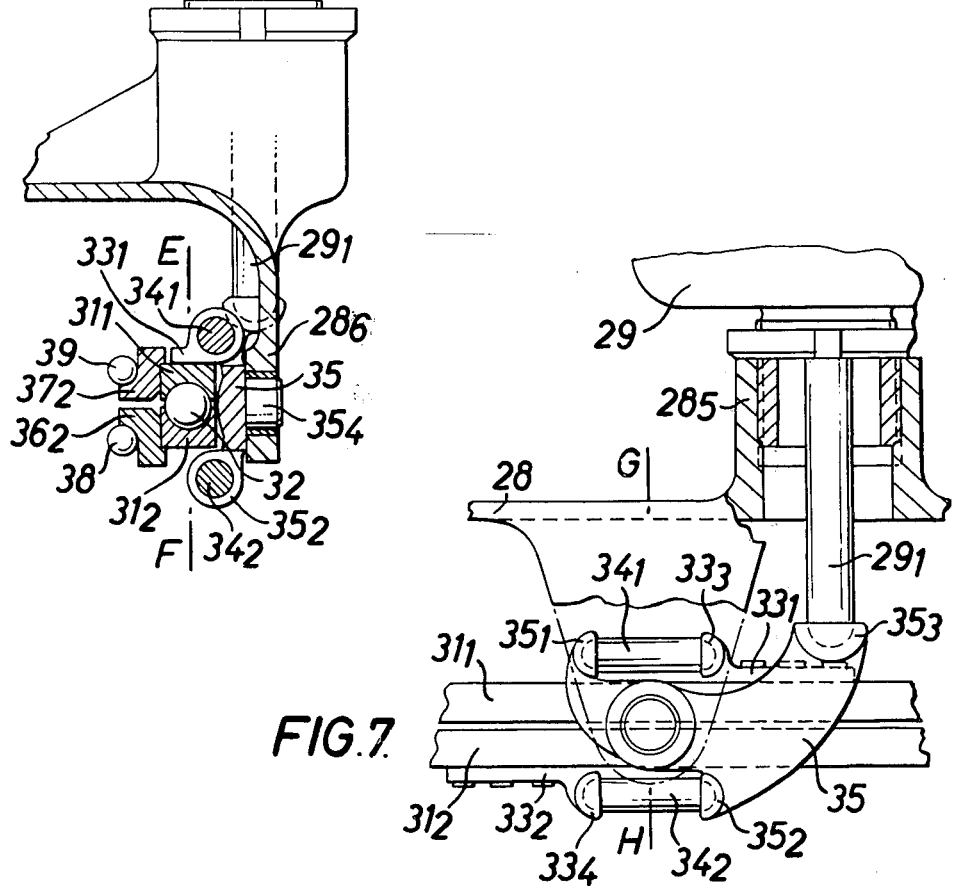

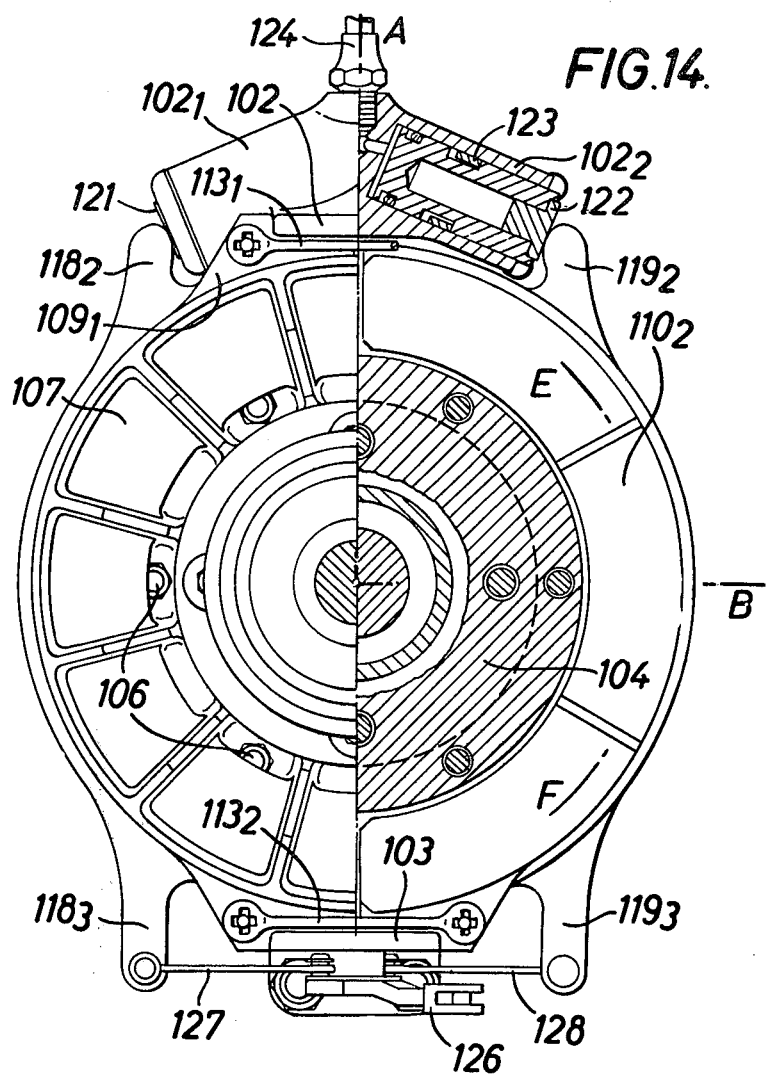
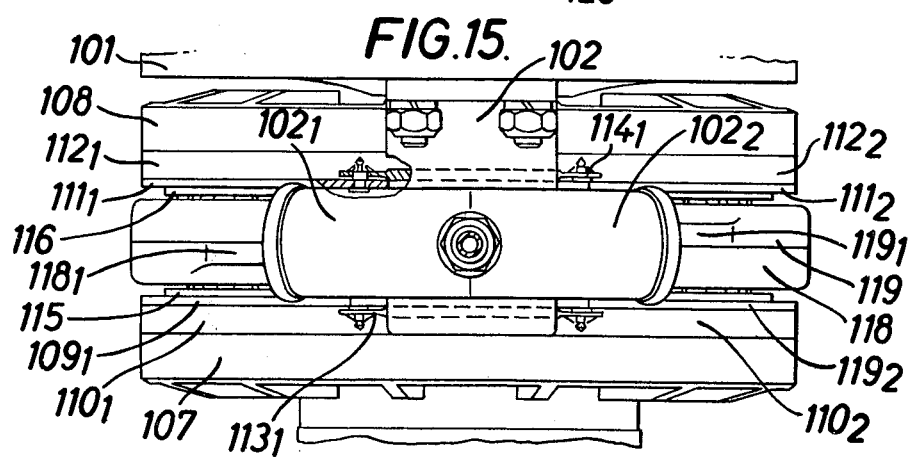
FIG.14.
FIG.15.

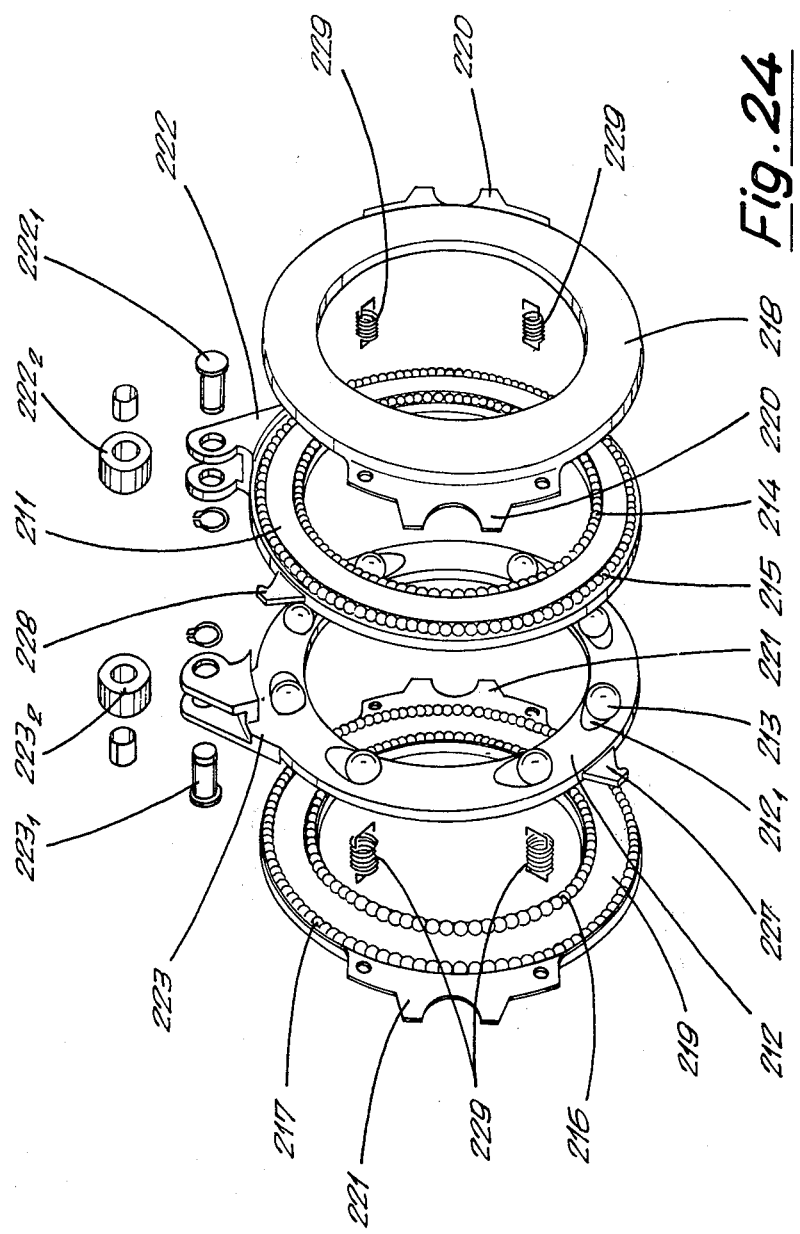

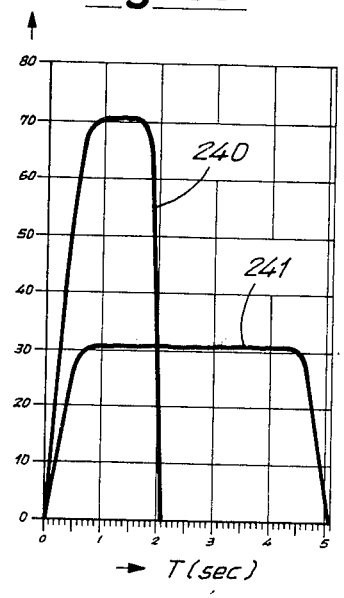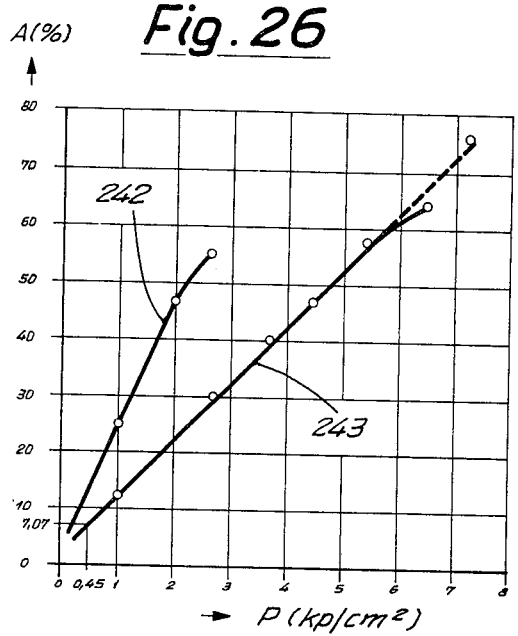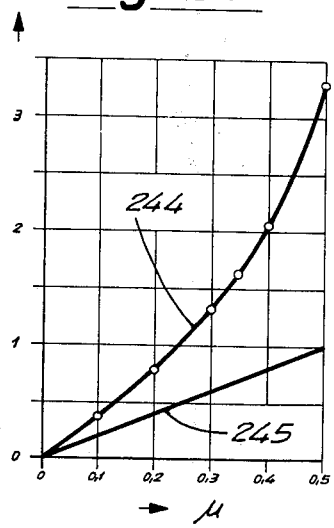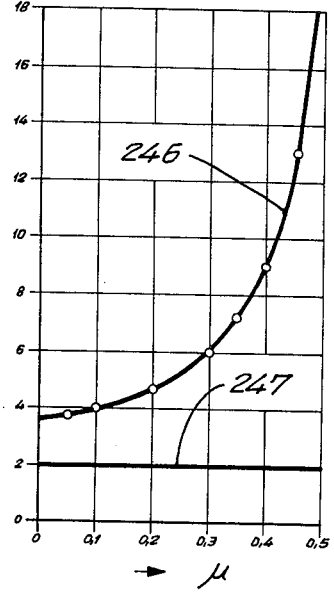

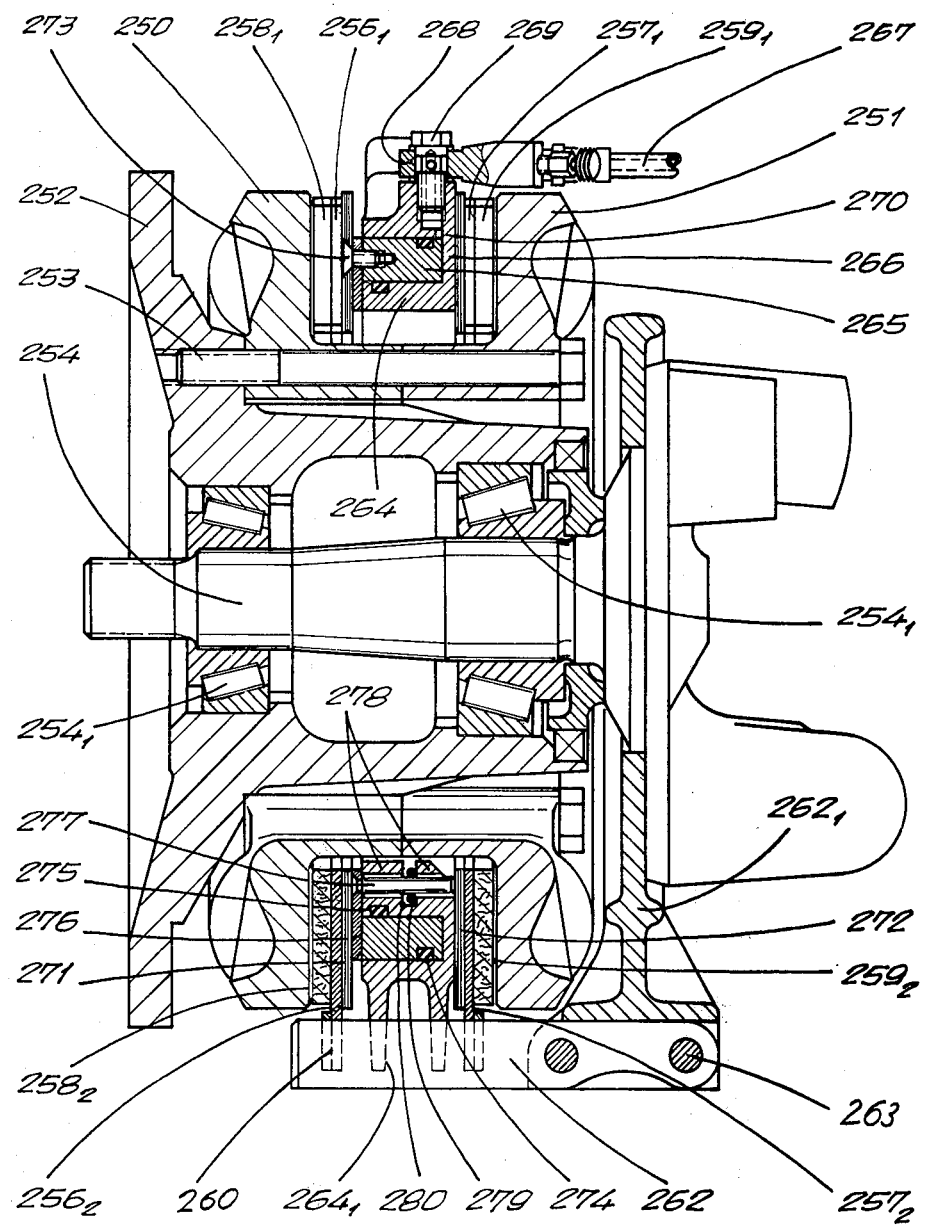
Fig. 29 (A-B)

SPREADING DISC BRAKE WITH REMOVABLE SHOES

This is a division of application Ser. No. 288,287, filed 9/12/72, now U.S. Pat. No. 3,885,650, which is a continuation-in-part of Ser. No. 73,566, filed Sept. 18, 1970, now abandoned.

This invention relates to brakes comprising oppositely disposed circular members spaced apart to provide an annular gap therebetween the inner side of each said circular member providing an annular braking surface, said circular members being attachable to so as to be rotatable jointly with for example the wheel of a wheel assembly, pairs of brake shoes disposed in the annular gap the friction linings of the shoes of each pair facing the braking surface of the adjacent circular member and means disposed between the brake shoes and operable by brake actuating means to effect movement of the brake shoes of each pair in a direction opposite to one another to cause said brake shoes to contact the braking surface of the adjacent circular member to effect braking.

The invention has for an object to provide improvements generally in the construction of brakes as above referred to.

According to the invention a brake assembly is provided comprising oppositely disposed circular members spaced apart to provide an annular gap therebetween the inner side of each said circular member providing an annular braking surface, said circular members being attachable to so as to be rotatable jointly with a wheel of a wheel assembly or other rotatable part to be braked, pairs of brake shoes disposed in the annular gap the friction faces of the shoes of each pair facing the braking surface of the adjacent circular member, a fixed member or members adapted to be secured to a stationary part of the wheel assembly or other part to be braked, brake shoe operating means disposed between the brake shoes and operable by brake actuating means to effect movement of the brake shoes of each pair in a direction opposite to one another to cause said shoes to contact the braking surface of the adjacent circular member to effect braking, the brake shoes being removable or replaceable from or into the annular gap in the radial direction thereof without dismantling the brake assembly.

The circular members provide in effect an annulus of channel section hereinafter for convenience referred to as a "brake housing", which advantageously is open around the outer circumference whereby the brake shoes can be inserted or removed in a radial direction into or out of the annular gap. The circular members can be formed integral with one another or can be formed separately and subsequently secured together to provide a brake housing of unitary construction.

The brake shoes are of arcuate form and constructed so that a practical maximum braking area is obtained commensurate with the general construction of the brake. Two or more pairs of brake shoes can be provided.

The brake shoe operating means is adapted to operate with a camming action to effect the separating movement of the shoes against the action of pull-off springs, the individual brake shoes of a pair being for example interconnected by the pull-off springs. The brake shoe operating means thus includes a ball or roller and ramp arrangement to provide the camming action. For example, the ball and ramp mechanism can consist of two rings, disposed side by side concentric with the circular members and disposed in a space between the pairs of brake shoes. The facing sides of the rings are provided with projections which form ramps, balls or rollers being interposed between the ramps of the pair of rings. By effecting relative angular movement between the pair of rings in the appropriate direction by the brake actuating means the pair of rings can be moved in a direction away from one another each ring moving the brake shoes adjacent thereto into contact with the appropriate brake shoes. Each ring of the pair of rings can be in one piece. Advantageously however each ring comprises at least two portions separated on a diameter, thus permitting the rings to be withdrawn from or inserted into the brake housing gap in a radial direction.

The fixed member of the brake assembly is provided with means for supporting the brake shoes against circumferential movement under the drag forces arising during a braking operation. The fixed member can for example be provided with flanges which extend over the open side of the brake housing each brake shoe having abutments which engage adjacent circumferentially spaced edges of the flanges. Advantageously the brake shoes and the flanges of the fixed member are constructed so that the brake shoes are restrained against radial displacement. The number of flanges or other means provided is dependent upon the number of pairs of brake shoes. All or some of the flanges or other means are removable or mounted so that the same can be moved clear of the brake housing to permit withdrawal or insertion of the brake shoes and/or rings of the brake shoe operating means.

In order to facilitate the operation of the brake shoe operating means, means are advantageously provided between the faces of the angularly movable members of the brake shoe operating means and the adjacent faces of the brake shoes. For example ball or roller bearings are disposed between the said adjacent faces as disclosed in the specification of co-pending application No.

Figure 4:
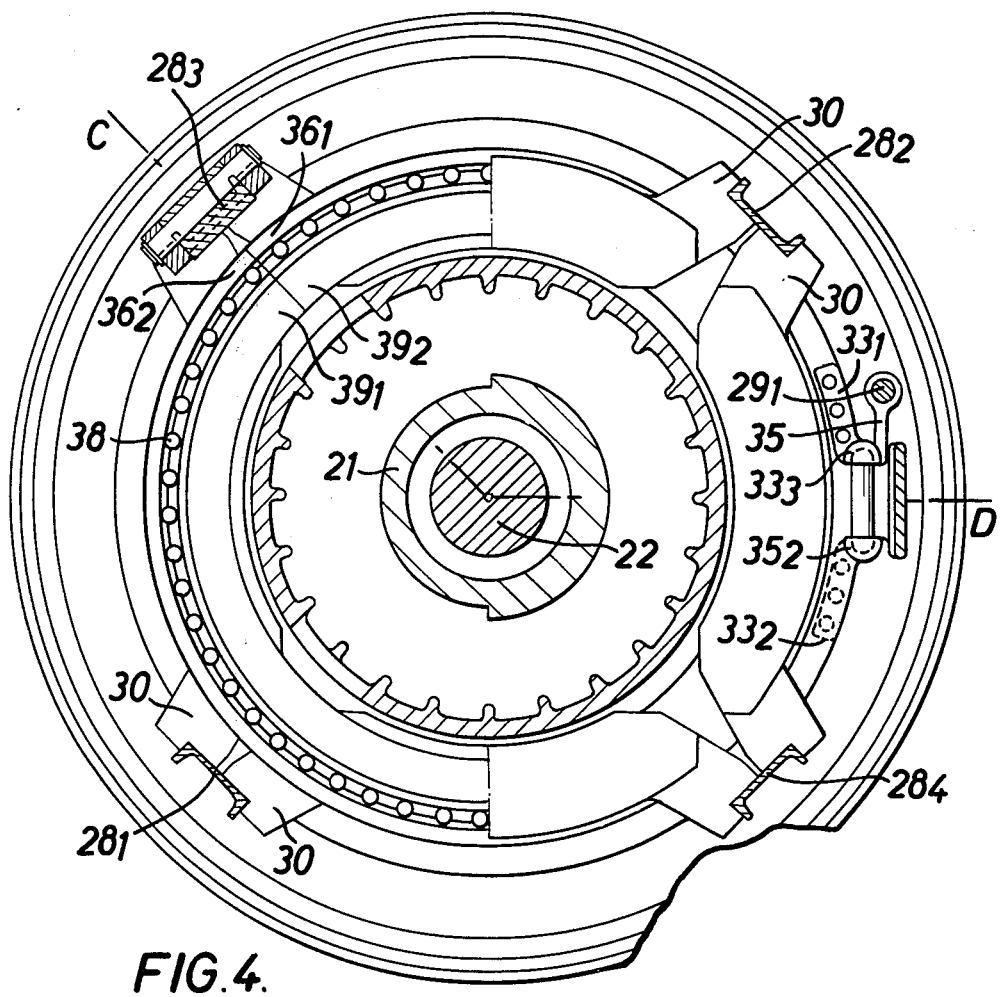
Figure 9:
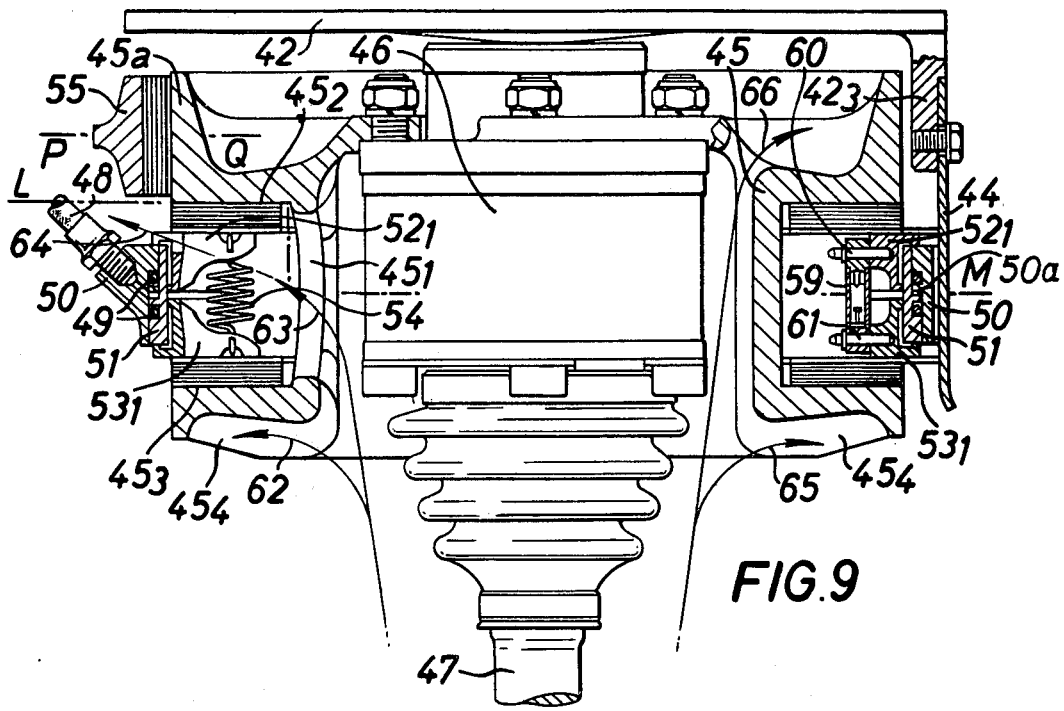
Figure 10:
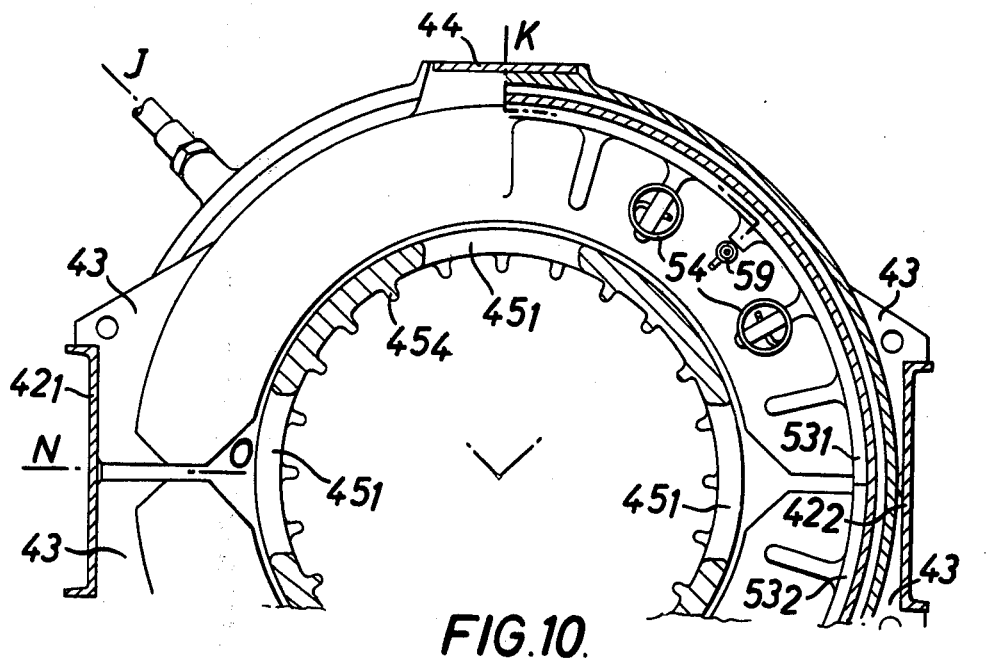
Figure 11:
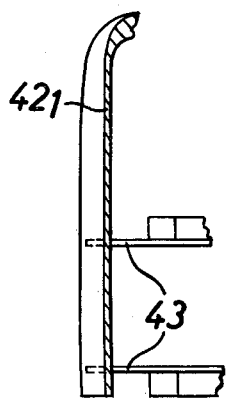
Figure 12:
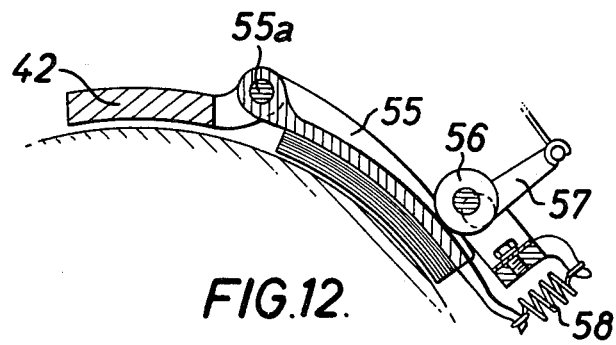
Figure 13:
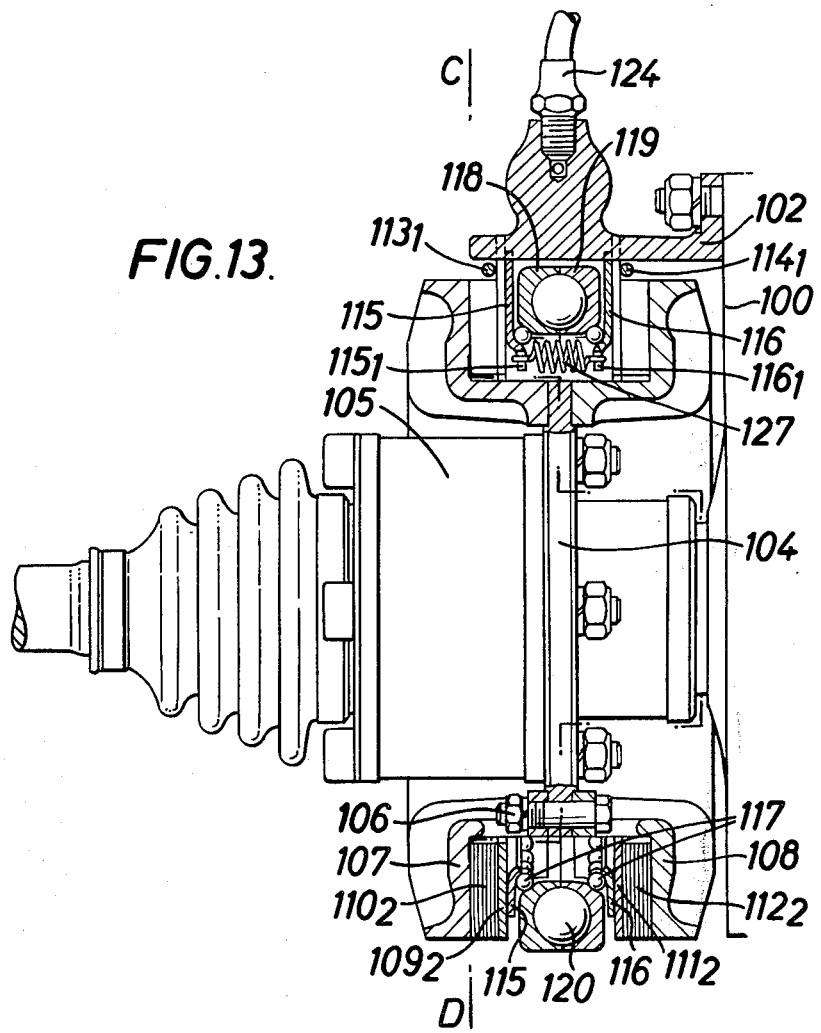
Figure 16:
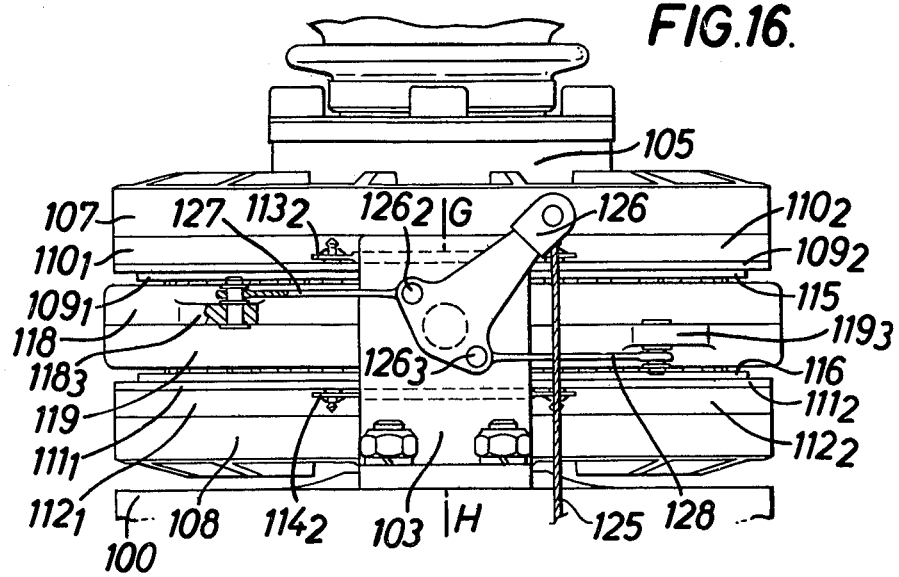
Figure 17:
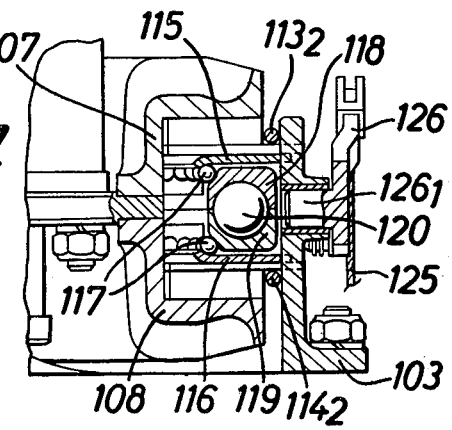
Figure 18:
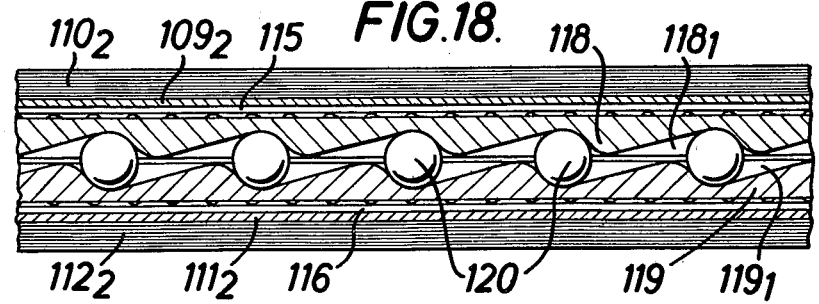
Figure 19:
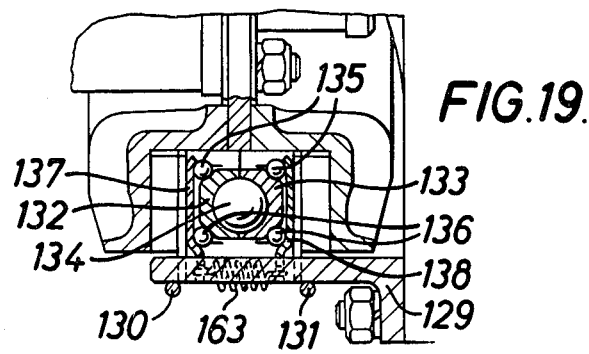
Figure 20:
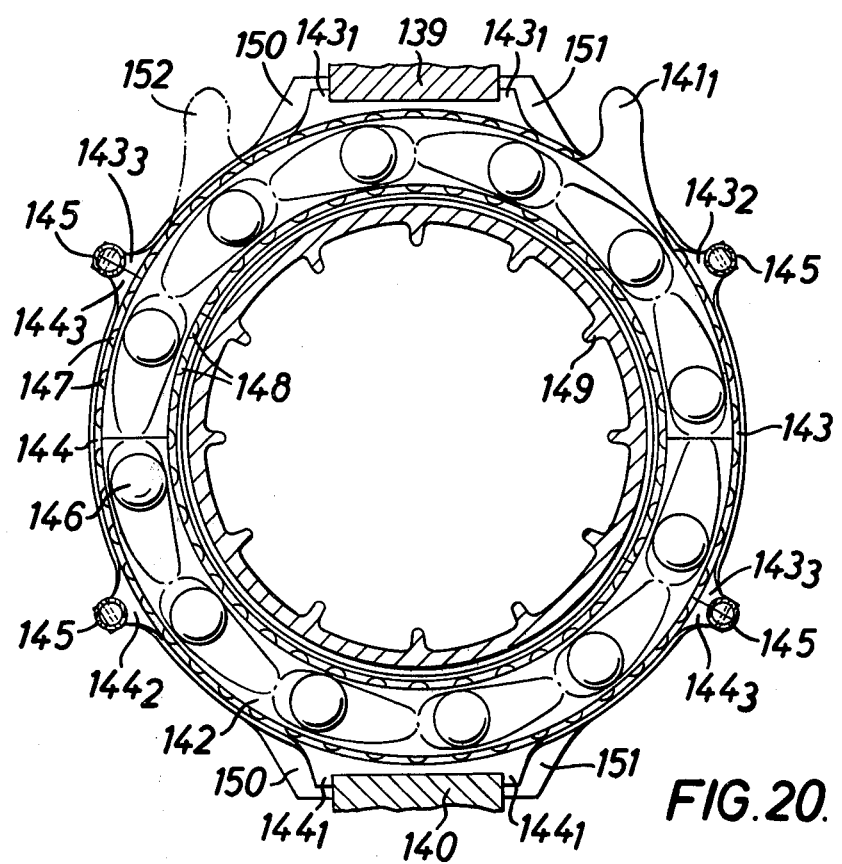
Figure 21:
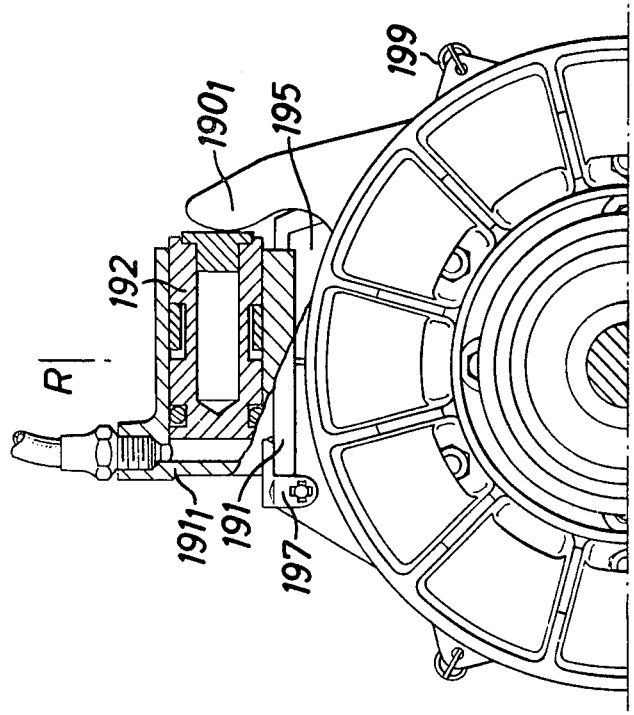
Figure 22:
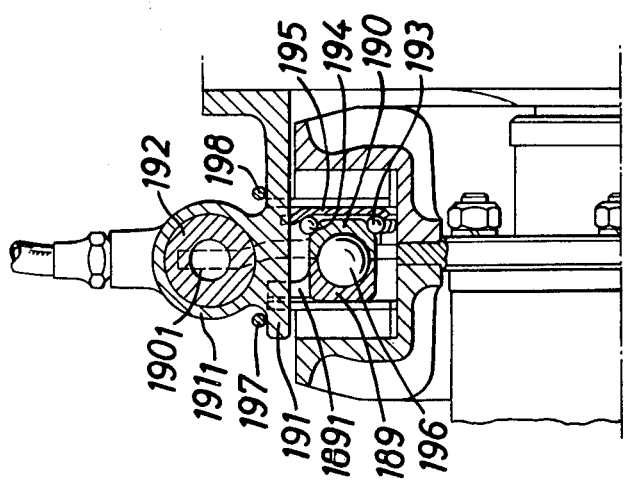

Embodiments of the invention will now be described by way of example with reference to the accompanying drawings in which:

FIGS. 1 and 2 are fragmentary views in section, of respectively a conventional disc brake and brake according to the invention, the views being used to compare the ratios of expansion of the respective brakes, FIGS. 3 and 4 show a brake according to one embodiment of the invention, FIG. 3 being a view on the line C-D in FIG. 4 and FIG. 4 a view on the line A-B in FIG. 3, FIG. 5 is a view on the line E-F in FIG. 6 showing enlarged, part of the brake shoe operating means, FIG. 6 is a view on the line G-H in FIG. 7, FIG. 7 is a view as seen from the right of FIG. 6, are partly in section, FIG. 8 is a view of the brake as seen from the top of FIG. 3, FIGS. 9 and 10 are views of a brake according to a second embodiment of the invention, FIG. 9 being a view on the line J-K in FIG. 10 and FIG. 10 on the line L-M in FIG. 9, FIG. 11 is a fragmentary view on the line N-O in FIG. 10, FIG. 12 is a view on the line P-Q in FIG. 9, FIGS. 13, 14 and 15 show a brake construction according to a still further embodiment, FIG. 13 being a section on the line A—B in FIG. 14, FIG. 14 being a section on the line C—D in FIG. 13 and FIG. 15 a top plan view of FIG. 14, FIG. 16 is a top plan view of a brake generally similar to that of FIGS. 13 to 15 but showing alternative brake actuating means, FIG. 17 is a view on the line G—H in FIG. 16, Fig. 18 is an enlarged fragmentary view on the line E—F in FIG. 14, FIG. 19 is a fragmentary section of the brake, FIG. 20 is a section showing a further construction of brake, FIGS. 21 and 22 are views of a brake according to still another embodiment of the invention, FIG. 22 being a view on the line R—S in FIG. 21.

Figure 23:
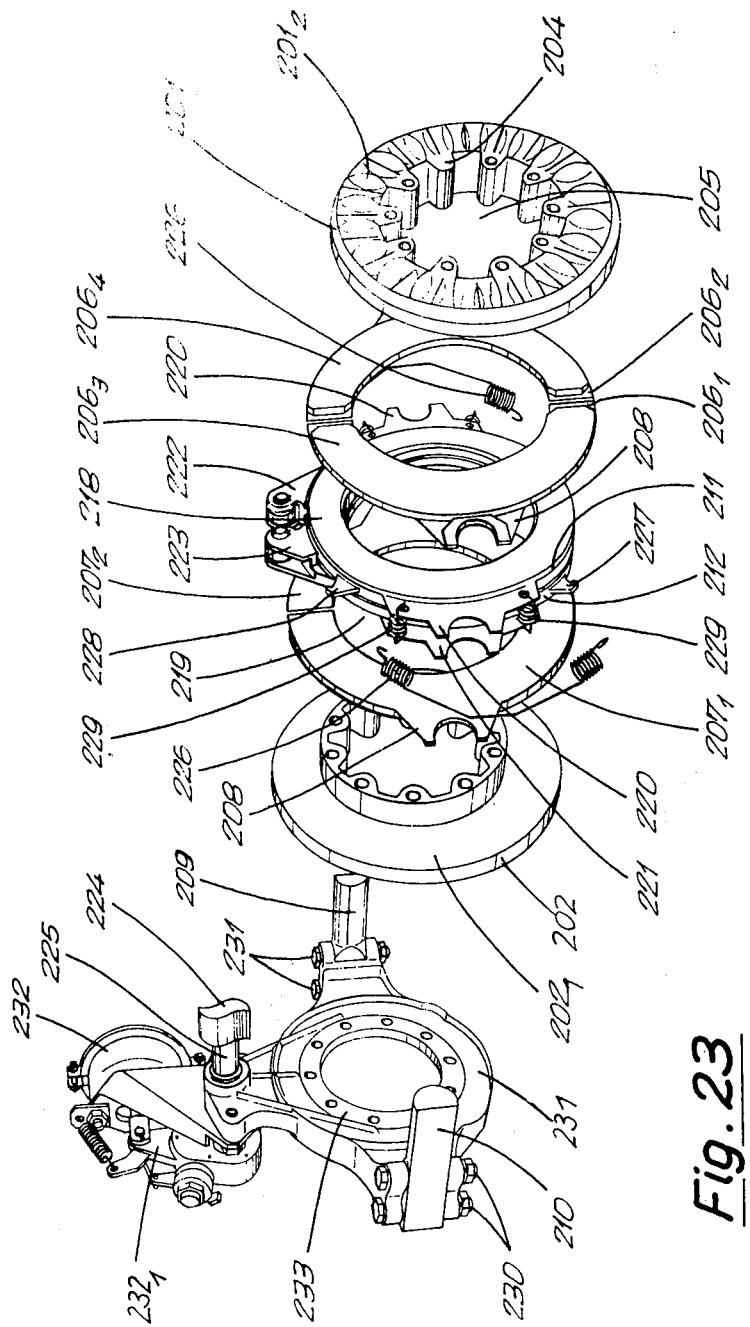
Figure 30:
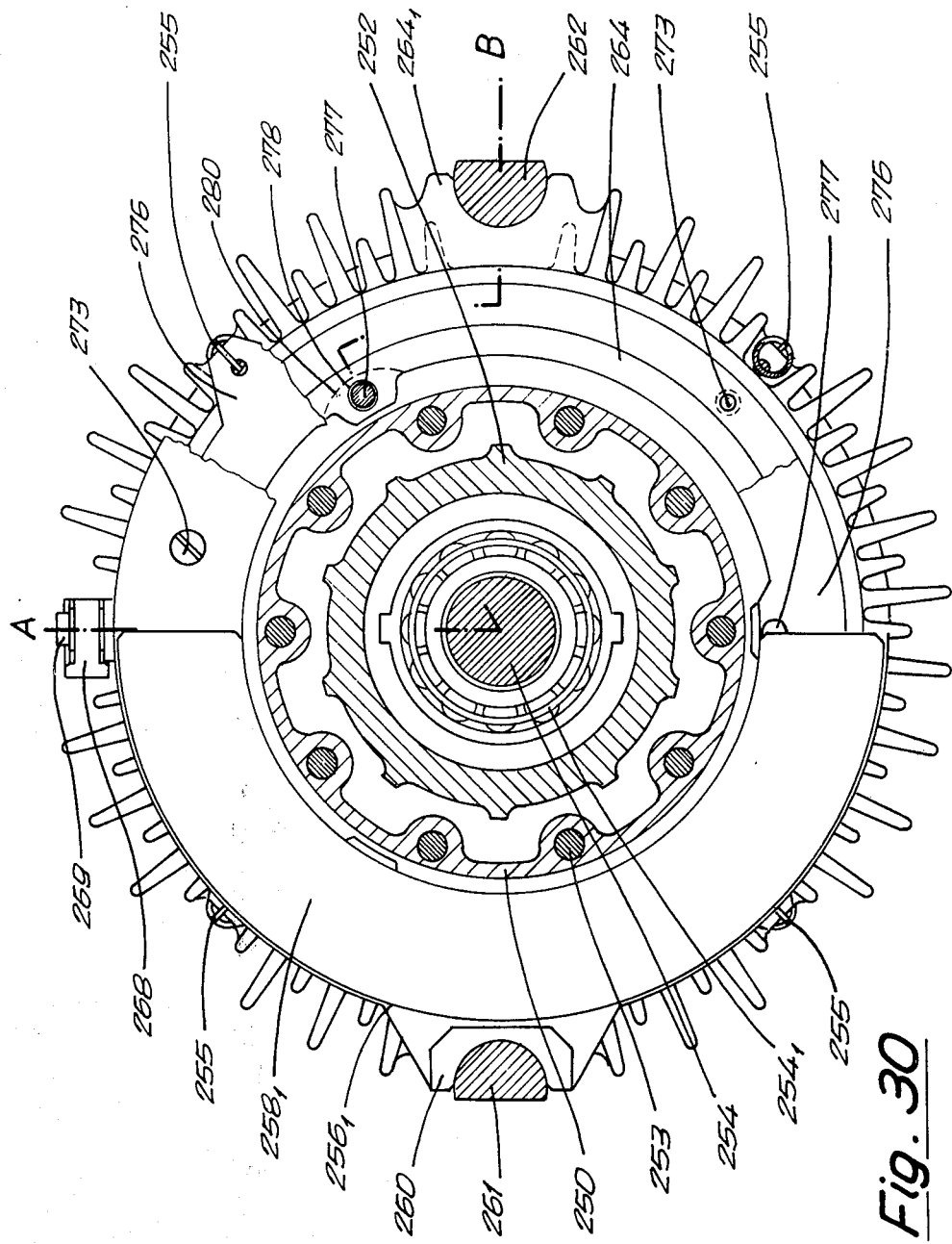
Figure 31:
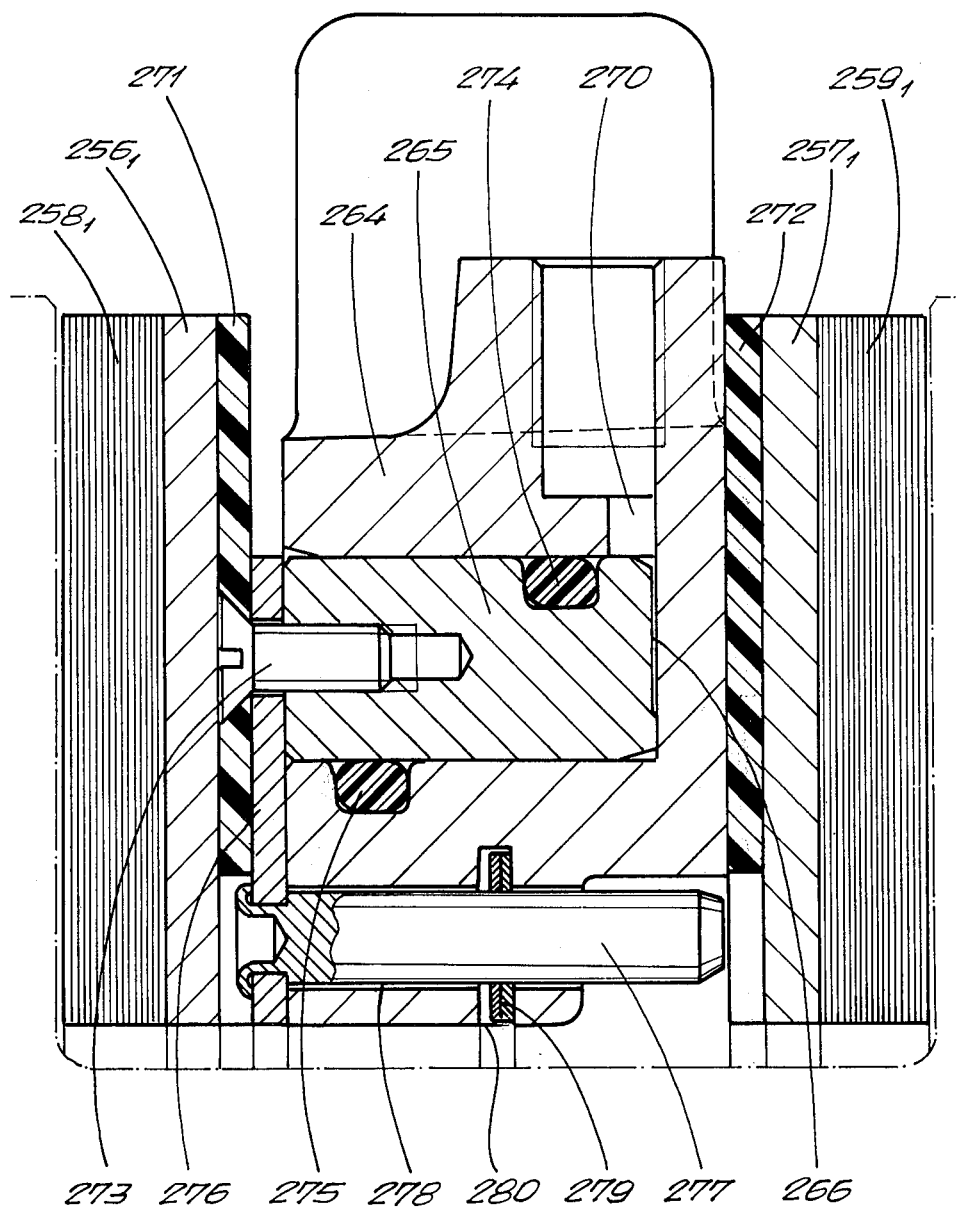
Figure 32:
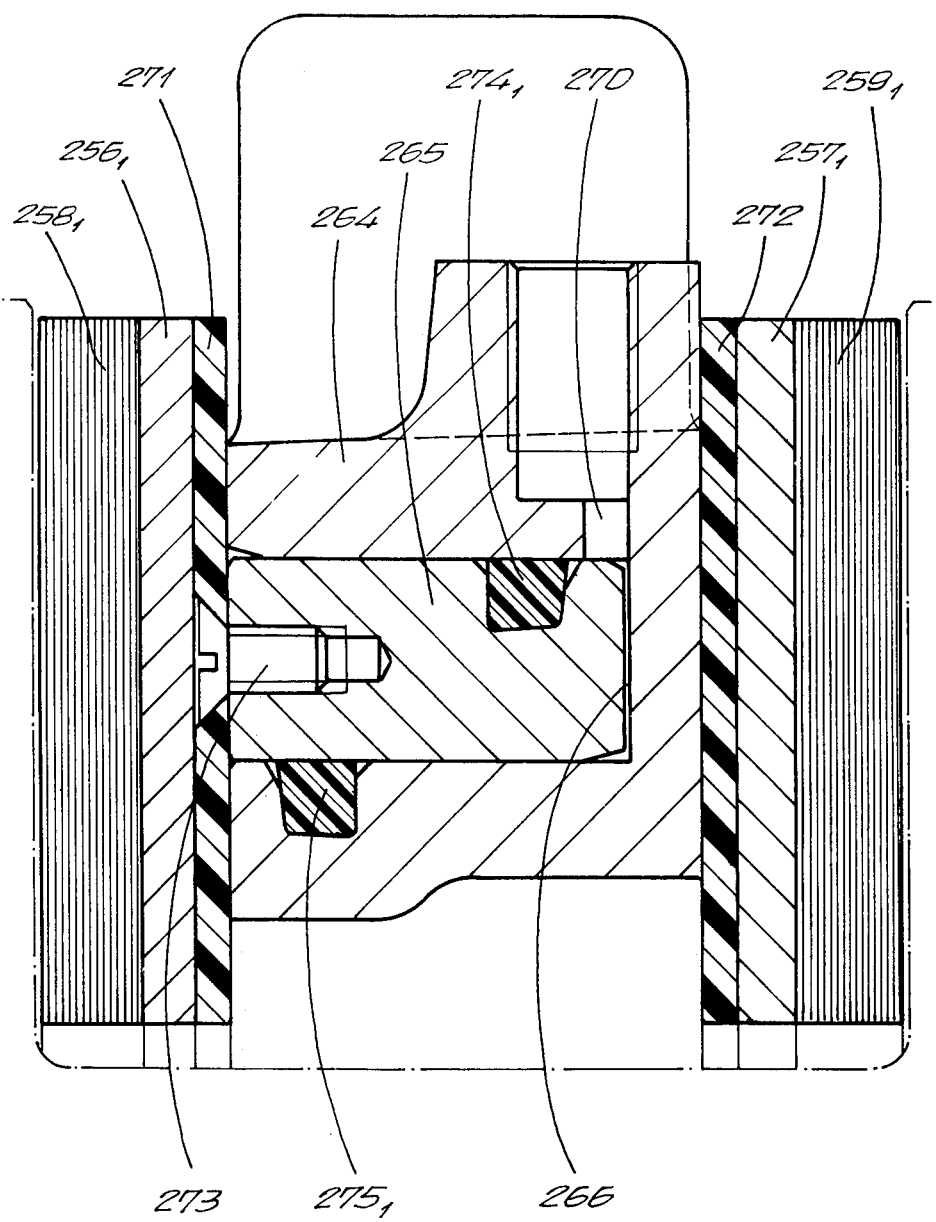

FIGS. 23 and 24 are exploded views of a further embodiment of the invention, FIG. 24 is an enlarged detail of FIG. 23, FIGS. 25 to 28 show diagrams for the brake of FIGS. 23 and 24 taken during a practical test, FIGS. 29 to 32 show a further embodiment of the invention, FIG. 29 being a section on the line A—B in FIG. 30, FIG. 31 is an enlarged view of a part of the actuating means in FIG. 29, FIG. 32 shows an embodiment of alternating actuating means.

The brake of the present invention is constructed to provide a practical maximum braking area commensurate with the brake design. Thus the brake shoes extend over the major portion of the braking surfaces of annular braking surfaces of a "brake housing" adapted to rotate with a wheel of a wheel assembly or other rotating part to be braked and is thus distinct from the more well known and conventional form of disc brake of the "spot" type. FIGS. 1 and 2 of the accompanying drawings are used to indicate certain advantages obtained by brake construction of the invention over spot type disc brakes.

FIG. 1 shows diagrammatically a spot type disc brake. The reference numeral 1 indicates a rotating hollow cast brake disc. 2 and 3 are the brake pads which are normally fixed to metal backing plates 4 and 5 and which during the braking operation are pressed against the brake disc 1. Under thermal strain the rotating brake disc 1 expands in the direction of arrows 6 and 7, the brake linings with backing plates in direction of arrows 8 and 9. The opposed directions of the arrows 6 and 8 and 7 and 9 respectively indicate the change in the play of the lining and the friction surface with the heated brake so that the regulation of the clearance of the brake has to be done according to these proportions. These overlapping expansions are the primary reason for the difficulty in obtaining a mechanical actuation with a conventional disc brake and in addition the high specific surface capacity is the reason why the conventional spot type disc brake is unsuitable for heavy duty requirements, e.g. for commercial or other heavy motor vehicles. The brake principle according to the invention is shown diagrammatically in FIG. 2. The brake includes a brake housing 10 having radial ribs, the brake shoes 11 and 12 with brake linings 13 and 14. During operation when the brake becomes heated the brake housing 10 expands in the direction of arrows 15, 16 the brake shoes 11 and 12 with brake linings 13 and 14 expand in the direction of arrows 17 and 18. The clearance marked with the double-arrows 19 and 20 is essentially kept as indicated double-arrows 19' and 20' after expansion of the heated brake elements.

The brake construction shown in FIGS. 3 to 8 is particularly suitable for commercial or other heavy duty vehicles. The disc brake assembly is fitted to the wheel assembly comprising wheel axle 21 drive shaft 22 and wheel 25 with hub 24 mounted on roller bearings 23. The hub 24 has a ring of studs 26 which secure the brake housing 27 thereto so as to be rotatable with the hub. The studs 26 screw into tapped holes in bosses on the external surface of one side of the brake housing. The brake housing 27 is an integral structure and consists of an annular member of channel section which is disposed with its open outer peripheral side radially outwards. The opposite inner walls of the channel section provide annular braking surfaces 27a, 27b respectively. A plurality of circumferentially spaced ribs 27c each extend around the outer surface of the brake housing 27 to promote cooling of the brake. A fixed bracket 28 is secured by a ring of bolts to a fixed flange of the wheel assembly so as to be non-rotatable. The fixed bracket is in the form of a four arm spider (see FIG. 8), and has four flanges $28_1$, $28_2$, $28_3$, $28_4$ respectively which are equally angularly spaced from one another and each extending over the open side of the brake housing. The flanges $28_3$ and $28_4$ are disposed diametrically opposite one another and are each pivotally mounted on the fixed bracket so that they can be turned in a clockwise direction from the position shown in FIG. 3 to a position in which the open side of the brake housing is uncovered. This permits the insertion or removal of the brake shoes. Each flange is secured in the operative position by a bolt as shown in FIG. 3.

Disposed within the gap between the braking surfaces of the brake housing are four pairs of brake shoes 30. Each pair of brake shoes consists of an outside and an inside disposed brake shoe. The shoes are each of arcuate form and have a lining of friction material on one side. The brake shoes are assembled with the friction linings facing the braking surfaces of the brake housing the brake shoes of each pair being movable in a direction away from one another to bring the friction linings of each pair into contact with the oppositely disposed braking surfaces of the brake housing by brake shoe operating means. The brake shoes are restrained against circumferential displacement under the drag forces created by contact of the friction linings with the braking surfaces of the brake housing during a braking operation by providing each shoe with a pair of spaced shoulders the spacing of the shoulders being such that when the brake shoes are assembled the shoulders are positioned one at either circumferential end of a flange $28_1$, $28_2$, $28_3$ or $28_4$, the flange ends each providing an abutment for the brake shoe shoulders. The circumferential length of the brake shoes is such that a maximum braking area is obtained commensurate with the general brake construction. The number of flanges on the fixed bracket is dependent upon the number of pairs of brake shoes provided. It is however necessary to have sufficient flanges to provide the requisite number of abutments for the pairs of shoulders on the brake shoes. Thus in FIG. 3 four flanges are shown which provide eight abutments for the eight shoulders of the four brake shoes adjacent one side of the brake housing and the eight shoulders of the four brake shoes adjacent the other side of the brake housing.

The brake shoe operating means is disposed within the brake housing and between the pairs of brake shoes the said means operating with a camming action to effect the separating movement of the shoes of each pair. The brake shoe operating means incorporates a ball or roller and ramp mechanism as now described. Two rings $31_1$ and $31_2$ having an inside diameter greater than the outside diameter of the brake housing are arranged side by side between the pairs of brake shoes. The sides of the rings facing one another are each provided with a plurality of projections in the form of ramps the ring $31_1$ having ramps $31_3$ and ring $31_2$ the ramps $31_4$, balls 32 being disposed between the ramps as shown in FIG. 5. The ring $31_1$ has a thrust member $33_1$ secured thereto having a socket $33_3$ at one end, the ring $31_2$ having a similar thrust member $33_2$ with a socket $33_4$ at its free end. An actuating arm 35 is pivotally mounted on a pivot pin $35_4$ carried by a lug on the fixed bracket 28. The actuating arm has two sockets $35_1$, $35_2$, the socket $35_1$ facing the socket $33_3$ of the thrust member $33_1$ the socket $35_2$ facing the socket $33_4$ of thrust member $33_2$. A tappet $34_1$ extends between the sockets $35_1$, $33_3$, and a tappet $34_2$ extends between the sockets $33_4$ and $35_2$. The actuating arm 35 has a third socket $35_3$ which receives one end of an actuating rod $29_1$ the other end of which is connected to the diaphragm of a diaphragm type pneumatic cylinder 29 forming the brake actuating means, the rod $29_1$ extending parallel to the axis of rotation of the wheel and is guided by a bearing extension $28_5$. The pneumatic cylinder 29 is carried by the fixed bracket 28 of the brake assembly and is connectable to the pneumatic system on the vehicle. When the pneumatic cylinder is operated the diaphragm movement slides the actuating rod $29_1$ outwardly (downwards in FIG. 7). This causes the arm 35 to turn in a clockwise direction (FIG. 7) with the result that the rings $31_1$ and $31_2$ are moved angularly relative to one another in opposite directions. The rings thus move away from one another due to the ball or roller and ramps. Each ring thus moves the adjacent brake shoes into contact with the braking surfaces of the brake housing against the action of the pull-off springs 41 a number of which are provided around the brake shoes. To facilitate the actuation of the brake shoes, ball bearings are provided between the rings $31_1$, $31_2$ and the brake shoes. The ball bearing consisting of outer race $37_2$ inner race $40_2$ and balls 39 is disposed between the ring $31_1$ and the appropriate brake shoes, a similar bearing consisting of the outer race $36_2$ inner race $39_2$ and balls 38 being disposed between ring $31_2$ and the appropriate brake shoes.

FIGS. 9 to 12 of the drawings show a brake construction particularly suitable for use on private vehicles. The brake assembly includes a brake housing 45 which is of integral construction and consists of an annular member of channel section adapted to be secured by a ring of studs to the wheel hub 46 driven by the wheel axle 47. The base of the brake housing has apertures $45_1$ and the external surfaces have circumferentially spaced ribs $45_4$ to promote the circulation of air for cooling. The arrows 62, 63, 64, 65 and 66 in FIG. 9 show the path of the cooling air through and around the brake. The opposite inner annular surfaces of the brake housing $45_2$, $45_3$ respectively each provide an annular braking surface. Disposed within the gap between the annular braking surfaces of the brake housing are two pairs of brake shoes 43 each of arcuate form and having a lining of friction material on one face, the shoes being arranged with the friction linings facing the adjacent annular braking surface of the brake housing. Each pair of brake shoes consists of an outside and an inside disposed brake shoe. The arcuate length of the shoes is such that a maximum braking area is obtained. A fixed bracket 42 provided by the wheel axle housing cover has two diametrically opposite flanges $42_1$, $42_2$ respectively each of which extends over the open periphery of the brake housing. The brake shoes are each formed with shoulders the shoulders on a shoe being so positioned in relation to one another that when the brake shoes are assembled the shoulders bear against the adjacent end of a flange, said ends providing fixed abutments whereby the brake shoes are restrained against circumferential movement under the drag forces created during a braking action the brake shoes of each pair being capable however of movement towards or away from one another.

The brake shoe operating means is operated by hydraulically actuated brake actuating means. The brake shoe operating means consists of two rings 50, 51 respectively each of L section, the rings being assembled so that they partially overlap to provide between them an annular space 50a into which hydraulic liquid from the hydraulic system on the vehicle is delivered through a brake pipe connection 48. O type sealing rings 49 are provided to seal the space 50a. The admission of the hydraulic liquid into the annular space 50a causes the rings 50, 51 to slide relative to one another in opposite directions which movement is in turn transmitted to a further pair of rings $52_1$, $53_1$ each of which is interposed between respectively the sliding ring 50 and the appropriate brake shoes and the sliding ring 51 and the brake shoes appropriate thereto. The brake shoes 43 of each pair of brake shoes are therefore moved away from one another and into contact with the annular braking surfaces of the brake housing to effect a braking action. A plurality of circumferentially spaced pull-off springs 54 are provided which operate to pull the brake shoes towards one another to release the brake when the hydraulic liquid is released. Automatically operating brake adjusting means are provided. This is indicated generally by reference numeral 59 and can be of the friction type the co-operating members of which are secured to the rings $52_1$, $53_1$ by respectively studs 60, 61. The adjusting means can be assembled through the apertures $45_1$ in the brake housing.

The brake is also provided with means for restraining the brake shoes against displacement in a radially outward direction. For this purpose the fixed bracket 42 has two lugs $42_3$ disposed diametrically opposite one another and equally spaced from the flanges $42_1$. Each lug has an arm 44 secured thereto by a bolt each arm extending over the open periphery of the brake housing to engage adjacent outer edge portions of the brake shoes. The arms 44 are advantageously resilient, for example made of spring steel, to reduce or eliminate brake rattle or chatter. By removing the arms 44 the brake shoes can be inserted into or removed from the brake housing without completely dismantling the brake assembly.

The brake of the present embodiment can be adapted for mechanical operation so that the same can be used as a hand brake in addition to the power operation by hydraulic liquid, the mechanical and hydraulic means being operable independently of one another. As shown in FIGS. 11 and 12 the brake housing 45 has an annular rim 45a formed integral therewith the outer peripheral face of which provides a braking surface engageable by the friction lining of a brake shoe 55. The brake shoe is pivotally mounted about one end on a pivot pin 55a carried by a lug of the fixed bracket 42. The brake shoe 55 is pressed against the rim 45a to effect braking by brake shoe operating means consisting of a roller 56 which is mounted on an arm 57 mounted so as to be swingable about a pivot pin carried by a further lug on the fixed bracket 42. The roller 56 is eccentrically mounted in relation to the pivotal mounting of the arm 57 so that by swinging the arm 57 in an anti-clockwise direction (FIG. 12) the roller presses the brakee shoe 55 onto the rim against the action of a pull-off spring 58 one end of which is connected to a fixed anchorage on the further lug the other end being anchored to the brake shoe. Swinging movement of the arm 57 is effected through a cable coupled to the outer end of the arm and a hand brake lever on the vehicle.

In the embodiment shown in FIGS. 13 to 20 of the drawings the brake assembly incorporates a brake housing comprising an annular member of channel section. However in this embodiment the brake housing is made from separate components secured together to form a unitary structure. The brake also includes a modified brake shoe operating mechanism and is adapted for either power or mechanical operation, which are operable independently of one another so that the brake can be used as a hand brake on a vehicle.

The brake housing is made in two complementary half portions 107 and 108 respectively which are adapted to be secured together by bolting the same to a drive flange 104 by a ring of bolts 106. Tge drive flange 104 is bolted to the universal drive joint of the wheel assembly so as to rotate with the wheel.

Disposed within the channel section of the brake housing are two pairs of brake shoes, $109_1$, $111_1$ and $109_2$, $111_2$ respectively. The brake shoes are each of arcuate form advantageously of semi-circular form so that the adjacent ends of the brake shoes on the same side of the brake housing either abut one another or are in a close proximity to one another so that a practical maximum length of brake shoe is obtained which provides a practical maximum braking area. The brake shoes of a pair extend side by side the outer faces of brake shoes $109_1$, $111_1$ each having respectively a lining $110_1$, $112_1$ of friction material, the brake shoes $109_2$, $111_2$ each having respectively a lining of friction material $110_2$, $111_2$. The brake shoes are mounted in the brake housing so that the shoes of a pair can move towards or away from one another but are restrained against circumferential movement under the drag forces created during a brake operation and resulting from contact of the brake shoe linings with the braking surfaces of the rotating brake housing. For this purpose the fixed support of the brake assembly consists of two brackets 102, 103 respectively each of which is bolted to the fixed axle casing 101 of the wheel assembly, the brackets being diametrically opposite one another and each extending over the open side of the brake housing. The opposite ends of each bracket form abutments engageable by shoulders on the brake shoes so that the shoes are held against circumferential displacement. The two brake shoes $109_1$, $109_2$ are coupled together in the region of their adjacent ends by shackles $113_1$ and $113_2$ respectively, the two brake shoes $111_1$, $111_2$ being similarly coupled by shackles $114_1$, $114_2$ respectively. The shackles are removable to permit installation or removal of the brake shoes.

The brake shoe operating means is disposed between the pairs of brake shoes and operates with a camming action provided by a ball or roller and ramp mechanism to move the brake shoes away from one another to effect a braking action and against the action of pull-off springs. The brake shoe operating means comprises a ball and ramp mechanism consisting of two actuating rings 118, 119 respectively mounted side by side. As shown in FIG. 18, the sides of the rings facing one another have a plurality of circumferentially spaced projections formed to provide ramps $118_1$, $119_1$ respectively balls 120 being disposed between the rings. The actuating rings 118, 119 are each rotatably supported on ball bearings 117 the inner races for each set of balls being provided on the appropriate actuating ring. Two pressure rings or thrust rings are disposed one on the outer side of each actuating ring the pressure ring 115 being between actuating ring 118 and the brake shoes $109_1$, $109_2$, the pressure ring 116 being between the actuating ring 119 and the brakes shoes $111_1$, $111_2$. The thrust rings are formed to provide the outer race for the ball bearings, the said rings each having shoulders which bear against the adjacent opposite ends of the fixed brackets 103, 102 so that the thrust rings whilst being free to slide towards or away from one another are held against circumferential movement. To effect a separating movement of the brake shoes of each pair to cause a braking action, the actuating rings 118, 119 are angularly rotated in opposite directions by brake actuating means, whereby the rings move away from one another under the action of the balls and ramps, the separating movement being transmitted to the brake shoes through the thrust rings 115, 116.

The brake actuating means is hydraulically operated and comprises a cylinder unit consisting of two opposed hydraulic cylinders $102_1$, $102_2$ mounted on the fixed bracket 102. Each cylinder has a piston 121, 122 respectively, the inner ends of the cylinders being open to a common inlet for hydraulic liquid connectable by a brake pipe to the hydraulic braking system of the vehicle. The outer end of piston 121 bears against an outwardly projecting lug $118_2$ on the actuating ring 118, the outer end of piston 122 bearing against a similar lug $119_2$ on the actuating ring 119. Thus when hydraulic liquid enters the cylinder unit, the pistons 121, 122 move outwardly in opposite directions so that the actuating rings are angularly rotated appropriately in opposite directions.

For mechanical operation of the brake according to this embodiment, the actuating ring 118 has an outwardly extending arm $118_3$, the actuating ring 119 having a similar arm $119_3$. The fixed bracket 103 has a pivotal mounting for the spigot $126_1$ of a toggle lever 126 which has two pivot connections $126_2$, $126_3$ respectively equi-spaced one on either side of the spigot centre. The pivot connection $126_2$ is connected to one end of a pull rod 127 the opposite end of which is pivotally connected to the outer end of arm $118_3$ of actuating ring 118, the pivot connection $126_3$ being connected to one end of a further pull rod 128 the other end of which is pivotally connected to the outer end of arm $119_3$ of actuating ring 119. The outer end of the toggle lever 126 is connectable by a cable 125 to for example the hand brake lever of a vehicle. When the hand brake is applied the toggle lever 126 turns in a clockwise direction (FIG. 16) thus angularly rotating the actuating rings in opposite directions to effect separation of the brake shoes.

FIG. 19 shows a modification of the construction of the brake shoe operating means disclosed in FIGS. 13 to 18. According to this modification each actuating ring 132, 133 respectively is supported on radially outer and inner ball races 135, 136 respectively. The thrust rings 137, 138 respectively are each formed to provide the outer races of the ball races the actuating rings being formed to provide the inner races. Pull-off springs 163 are coupled between the thrust rings 137, 138, the shackles 130, 131 being in this construction, arranged radially outwards of the fixed bracket 129.

The brake construction of FIG. 20 incorporates brake shoe actuating means as described in connection with FIG. 19. However the same has been modified to facilitate assembly. The brake housing 149 of FIG. 20 can be of integral construction as disclosed for example in FIG. 3. In FIG. 20 the flanges 139 and 140 of the fixed support bracket are shown. These provide abutments for two pairs of brake shoes 150, 151 respectively each of which is of arcuate form and extend circumferentially for 180° so that a maximum braking area is attained. The actuating rings have the ball and ramp mechanism the balls being indicated by reference 146. Each actuating ring consists of two half portions 141, 142 respectively the adjacent ends abutting on a diameter. The actuating rings are supported on radially outer and inner balls 147, 148 respectively of the ball races as previously described. Similarly each thrust ring is made in two half portions 143, 144 respectively the adjacent ends also abutting on a diameter which is angularly offset to the abutting ends of the actuating rings. The thrust rings have circumferentially spaced radially outwardly extending projections $143_2$, $143_3$, $144_2$, $144_3$ to which pull-off springs 145 are anchored. The half portions 141 of the thrust rings have shouldered projections $143_1$ for engagement with the flange 139 and the half portions 142 of the thrust rings have shouldered projections $144_1$ the shoulders of the projections engaging the abutment edges of the appropriate flange 139 or 140 so that the thrust rings are held against circumferential movement but can move towards or away from one another.

The brake according to this embodiment can be actuated hydraulically, pneumatically and/or mechanically as previously described. For example, the actuating rings can as shown in FIG. 20, be provided with the lugs 152, $141_1$ respectively for actuation by a hydraulic cylinder unit as shown in FIG. 14.

FIGS. 21 and 22 of the drawings show a brake construction particularly suitable as a light duty brake wherein heavy braking loads will not occur. The brake housing 200 is constructed as described in connection with FIG. 16 but may also be of integral construction. The brake shoe operating means consists of the ball and ramp mechanism, the balls 196 being disposed between the two actuating rings 189, 190 respectively. The actuating ring 189 bears directly on the surfaces of the adjacent brake shoes and has outwardly extending spaced lugs $189_1$ which engage the abutment edges of the flange 191 of the fixed support so that the actuating ring 189 is held against circumferential movement but is slidable. The other actuating ring 190 is rotatably mounted on an inner and an outer ring of balls 193 and 194 respectively the ring being formed to provide radially inner and outer races for the balls. A thrust ring 195 is interposed between the balls 193, 194 and the brake shoes on the corresponding side of the brake housing, the thrust ring also being formed to provide radially inner and outer races for the balls. The brake shoes on one side of the brake housing are interconnected by shackles 197 the brake shoes on the other side being interconnected by shackles 198, the shackles being removable to permit withdrawal or insertion of the brake shoes out of or into the brake housing. Pull-off springs 199 are provided.

The brake is actuated hydraulically a hydraulic cylinder $191_1$ being formed integral with the flange 191. The cylinder inlet is connectable by a brake pipe to the hydraulic braking system of the vehicle and has a piston 192. The outer end of piston 192 bears against the outer end of a lug $190_1$ extending outwardly from the circumference of the actuating ring 190. Thus when hydraulic liquid is supplied to the hydraulic cylinder the piston 192 moves outwardly whereby the actuating ring is rotated angularly in a clockwise direction (FIG. 21) relative to the fixed actuating ring 189. The brake shoes on the opposite sides of the brake housing are therefore moved in a direction away from one another to effect a braking action. A friction ring type automatic brake adjusting means is shown diagrammatically in FIG. 21, the adjuster being incorporated in the hydraulic cylinder.

FIG. 23 and 24 show exploded views of a further embodiment of a brake assembly suitable for commercial or other heavy duty cars which incorporates a brake housing made from separate components forming a channel therebetween, showing a modified method of supporting the brake shoes and a modified brake shoe operating mechanism adapted for either power or mechanical operation. Brakes from a first series of prototypes have been tested under rough conditions and some results are shown in FIGS. 25 to 28.

The brake housing of this embodiment incorporates two annular brake covers 201 and 202. The brake covers each have an annular rim 203 formed integral therewith on its inner circumference adapted to form an annular space between the brake covers 201 and 202 open on its radially outer side when bolting the brake covers together to form an unitary structure. Either rim 203 is provided with a plurality of opposite disposed bolting holes 204. The opposite inner walls of the covers provide annular braking surfaces $201_1$, $202_1$ respectively. A plurality of circumferentially spaced rips $201_2$, $202_2$ around the outer surface of the brake covers promote cooling of the brake.

The brake housing is adapted to be fitted (not shown) to a rotating part of the wheel assembly extending through the circular opening 205 formed within the brake housing, i.e. to the hub, as to be rotable with that rotating part of the wheel assembly, whilst the stationary parts of the brake assembly are secured to a stationary part of the wheel assembly, e.g. to the steering knuckle.

Disposed within the annular space between the braking surfaces of the brake housing are two pairs of brake shoes, $206_1$, $207_1$ and $206_2$, $207_2$ respectively, each brake shoe is of arcuate semi-circular form and having a lining of friction material on one face as indicated by $206_3$, $206_4$ for shoes $206_1$, $206_2$ in FIG. 23, the shoes being arranged with the friction linings facing the adjacent annular braking surface of the brake housing. Each of the two complementrary brake shoes $206_1$, $206_2$ and $207_1$, $207_2$ define a disc.

The brake shoes are each formed with shoulders 208 adapted to support the shoes at two stationary yet removable brackets 209 and 210 pivotally mounted at a stationary carrier 231, the shoulders on the shoes being so positioned in relation to one another, that the flank ends of the brake shoe $206_1$ each providing an abutment for the brake shoe $206_2$ and the flank ends of the brake shoe $207_1$ each providing an aboutment for the brake shoe $207_2$. Thus, the entire discs of brake shoes are parted in two identical halfs $206_1$, $206_2$ and $207_1$, $207_2$ with a divisional plane along their flank ends and going through the middle of the distance between the two brackets and being vertically positioned thereto, which flank ends representing a further supporting area besides of the supporting points formed by the shoulders, so that advantageously no further means of connection between the brake shoes are afforded.

The brackets also function to restrain the brake shoes against circumferential movement under the drag forces created during the braking action and have supporting areas which are on either brackets and shoulders of rounded shape showing a half circular cross section so that no jamming will occur.

The brake shoe operating means are disposed between the brake shoes and operate with a camming action provided by a ball and ramp mechanism to move the brake shoes away from one another. The brake shoe operating means comprises a ball and ramp mechanism consisting of two actuating rings 211, 212 respectively mounted side by side. As shown in FIG. 24, the sides of the rings facing one another have a plurality of circumferentially spaced projections formed to provide ramps $211_1$, $212_1$ respectively and balls 213 being disposed between the rings. The actuating rings 211, 212 are each rotatably supported on ball bearings 214, 215 and 216, 217 respectively, the ball bearings 214, 216 disposed at the radially inner and the ball bearings 215, 216 disposed at the radially outer circumference of the actuating rings; each actuating ring being provided with races for each set of balls.

Two pressure or thrust rings are disposed one on the outer side of each actuating ring the pressure ring 218 being between actuating ring 211 and the brake shoes 206, $206_2$ the pressure ring 219 being between the actuating ring 212 and the brakes shoes $207_1$, $207_2$. The pressure or thrust rings are formed to provide the outer race for the ball bearings, the said rings each having shoulders 220, 221 respectively adapted support the thrust rings on the brackets 209, 210 so that the thrust rings whilst being free to slide towards or away from one another are held against circumferential movement. To effect a separating movement of the brake shoes of each pair to cause a braking action, the actuating rings 211, 212 are angularly rotated in opposite directions by brake actuating means, whereby the rings move away from one another under the action of the balls and ramps, the separating movement being transmitted to the brake shoes through the thrust rings 218, 219.

The actuating ring 211 is privided with an extension 222 which projects outwardly from the circumference, the actuating ring 212 being provided with a corresponding extension 223. Each extension is bifurcated at its outer end the bifurcated end of extension 222 having a pin $222_1$ supporting a pressure roller $222_2$, the bifurcated end of extension 223 having a pin $223_1$ supporting a pressure roller $223_2$. As shown in FIG. 23 the pressure rollers $222_2$, $223_2$ bear on opposite sides of an S-shaped double cam 224 disposed between the rollers the cam being mounted on one end of a spindle 225 rotatably supported in the stationaly carrier 231. The spindle 225 is connected externally of the brake assembly to an actuating lever, $232_1$, the actuating lever being operable by a compressed-air brake cylinder 232.

When the compressed-air brake cylinder is energised to effect a braking operation the spindle 225 is rotated by appropriate operation of the actuating lever so that the cam 224 is pressed against the pressure rollers $222_2$ and $223_2$ whereby the actuating rings 211 and 212 are angularly displaced relative to each other. Pull-off springs 226 provided between the actuating rings 211, 212 connected at extensions 227, 228 thereof are adapted to pull the actuating rings into initial position when releasing the brake. Pull-off springs 229 provided between the thrust rings 218, 219 connected to the shoulders 220, 221, operate to pull the thrust rings towards one another to release the brake when the actuating force is released. Furtheron the pull-off springs 229 keep the actuating means assembled during inserting or removal operation of the brake shoes. For this purpose, the brackets 209, 210 being pirvotally mounted by bolts 230 on the stationary carrier 231, can be turned aside so that no dismanting of the brake assembly is afforded when changing the brake shoes. The carrier 231 is provided with bore holes 233 as to be mounted therewith to the steering knuckle (not shown).

The testing results of brake assemblys according to FIGS. 23, 24 used for braking and stopping a fully loaded truck are shown in the diagram of FIG. 25, in which the percentual braking A is plotted on the time T in seconds. The car was provided with four brakes according to FIGS. 23, 24, its weight was 14060 kiloponds, the pneumatic pressure was 7,0 kp/cm$^2$ and the initial velocity was 50 kilometers p.h.. In this diagram curve 240 shows the braking when operated with the feet pedal, curve 241 shows the actuating by hand lever.

FIG. 26 shows a diagram of the percentual braking A in function of the pressure P in kp/cm$^2$. Curve 242 relates to a loaded truck with a weight of 14060 kp, curve 243 relates to the unloaded truck of 5800 kp weight. The end of curve 243 is drawn as interrupted line indicating the blocking areas of the wheels.

FIGS. 27 and 28 show the measured difference in the characteristic of a drum brake normally used in trucks of this kind and the disc brake according to this invention FIGS. 23, 24. In the diagram of FIG. 27 the ratio of brake power divided through expanding force and indicated as B is plotted against the coefficient of friction $\mu$. The curve 244 relates to the drum brake whilst curve 245 to the disc brake. The curve in FIG. 28 shows the first derivation of the curve in FIG. 27, interpreted as the sensibility $\phi$ against fluctuations of the friction coefficient $\mu$. The sensibility $\phi$ is defined by $$\tan \phi = \frac{d}{d\mu} \left( \frac{\text{breaking power at the circumference}}{\text{Expanding force}} \right)$$

The curve 246 relates to the drum brake and curve 247 to the brake according to this invention. Curve 247 shows how intensitiv this brake is against fluctuations of the friction coefficient.

A test simulating a continuous braking may show the brake's excellent thermal behaviour and resistance against thermal stress. A 12 minutes lasting braking has been simulated, presuming a velocity of 50 kilometers p.h. on a distance of 6 kilometers with 7 percent gradient. These conditions cause a cylinder pressure of 0,8 technical atmospheres per cylinder. Whilst under these test conditions normally used drum brakes would burn out the disc brakes according to FIGS. 23 and 24 after 12 minutes show a temperature of 290°C measured at the brake housing at a point 3 mm under the braking surface.

In another embodiment shown in FIGS. 29 to 32 of the drawings the brake assembly for the front wheel of a truck incorporates hydraulic operating means disposed between the brake shoes. In deviation to the brake construction also hydraulically actuated and shown in FIGS. 9 to 12 for use on light trucks with less than 3000 kp weight, this construction is suitable for use on heavy trucks up to a weight of 12000 kp and more. Furtheron this embodiment divers with the brake construction of FIGS. 23 to 28 only in the operating means and shows similar improved brake characteristics according to the diagrams of FIGS. 25 to 28.

The brake housing is made in two complementary half portions 250 and 251 respectively which are adapted to be secured together by bolting the same to a flank $252_1$ formed integral with the hub 252 by a serie of bolts 253 and are rotable with the front wheel. The hub 252 is journalled by means of taper roller bearings $254_1$ on the steering knuckle 254. The outer surface of the brake housing exposed to the passing air flow is provided with a pluralty of rips to promote cooling of the brake and the inner faces of the brake covers 250 and 251 being formed to provide annular braking surfaces being spaced apart to provide an annular gap there between.

Disposed within the annular gap are two pairs of brake shoes $256_1$, $257_1$ and $256_2$, $257_2$, each brake shoe is of arcuate semi-circle form having a lining of friction material $258_1$, $258_2$, $259_1$ and $259_2$ on one front facing the annular braking surface of the brake housing. The brake shoes are each formed with a shoulder 260 adapted to support the shoes at two stationary yet removable brackets 261 and 262 respectively, so as to be axially movable towards or away from one another but holded against circumferential movement.

The flank ends on the shoes being so positioned in relation to one another, that the flank ends of the brake shoe $256_1$ each provide an abutment for the flank ends of the brake shoe $256_2$ and the flank ends of the brake shoe $257_1$ each provide an abutment for the flank ends of brake shoe $257_2$. Thus the entire discs of brake shoes are parted in two identical halfs $256_1$, $256_2$ and $257_1$, 252 respectively along their flanks in a plane going through the middle of the distance between the two brackets and being vertically positioned thereto, whereby the abuting flanks representing a further supporting area besides the supporting points formed by the shoulders, so that advantageously no further means of connection between the brake shoes are afforded.

The brackets 261, 262 being pivotally respectively detacheable mounted by screws 263 on a caccier $262_1$ attached to the steering knuckle 254, the brackets extending over the open periphery of the brake housing and provide a rounded surface of supporting areas adapted to bear in corresponding concave hollows formed in the shoulders 260 so that no jamming will occur during the braking action. After unlocking the brackets and turning them aside, the brake shoes can be removed and replaced without dismantling the brake housing.

Disposed between the brake shoes but arranged separately therefrom are the hydraulic operating means representing a unity in itsself. The brake shoe operating means incorporate a ring-cylinder 264 provided with opposite disposed shoulders $264_1$ and $264_2$ respectively adapted to secure the operating means on the brackets 261 and 262 respectively so as th be axially movable but holded against circumferential movement. Interposed within the ring-cylinder 264 is a ring-piston 265 providing with the ring-cylinder an annular space 266, into which hydraulic liquid from the hydraulic system on the vehicle is delivered through a brake pipe connection 267, a socket piece 268 fitted with a hollow screw 269 and through a borehole 270. Two heat insulating rings 271 and 272 are attached to the ring-piston 265 and to the ring-cylinder 264 respectively, facing the adjacent brake shoes and are made of heat-insulating resistent material adapted to suppress heat conducting from the brake shoes to the actuating means. These insulating rings are connected by screws to the piston and to the cylinder as shown for ring 271 by screws 273. The admission of the hydraulic liquid into the annular space 266 causes the ring-cylinder 264 and the ring piston 265 to slide relative to one another in opposite directions against the action of pull-off springs 255 provided between the insulating rings to release the brake when the hydraulic liquid is removed.

Sealing rings 274 and 275 between the piston 265 and the cylinder 264 are provided to seal the annular space 266, the sealing rings being fitted in ring groves provided in either ring piston and ring rylinder, respectively.

In the embodiment shown in FIG. 32 the sealing rings also improve the automatic and infinitely variable readjustment in case the linings on the brake shoes are partly weared.

The sealing rings $274_1$, $275_1$ are of square form, fitted in corresponding formed square ring groves which improve a constant clearance between the surface of the linings and the surface of the rotating parts.

In the embodiment of FIGS. 29 to 31 the sealing rings 274 and 275 are of rounded type and the automatic and infinitely variable readjustment is achieved by a different method.

Interposed between the insulating ring 271 and the ring-cylinder 264 is a plate ring 276 being secured with the screws 273 to the piston 265. The ring-cylinder 264 provides circumferential spaced boreholes 278 adapted to fit slidable within pins 277 reveted with its end to plate ring 276. A spring ring 279 is provided on the pin 277 being secured within a slit 280 formed within the surface of the borehole 278.

In case the clearance between the brake shoes and the rotating surface of the housing increases over a predetermined size, the spring ring 279 causes the arrest of the rearward movement of the cylinder when hydraulic pressure is released, so that said clearance can be maintained constant.

I claim:
1. A brake assembly comprising:
  a brake housing comprising two annular covers bolted together and to the hub of a wheel at their inner circumferences to be rotable therewith, said covers forming an annular gap therebetween open on its radially exterior side, the opposite inner sides of said two covers providing annular braking sur- faces;

two pairs of semi-circular brake shoes disposed from the radially exterior side into said gap having friction linings facing the adjacent braking surfaces, each brake shoe having a shoulder with a flanked end, the shoulders of complementary brake shoes being oppositely disposed and the flank ends of said brake shoes providing abutments at one another, said flank ends being vertically situated to the line connecting the shoulders, each of said pairs of brake shoes being supported by two diametrically opposite disposed brackets extending over said annular gap and being pivotally mounted on a stationary carrier, said brake shoes being insertable into the gap from the radially exterior direction after removing the brackets and thereby uncovering said gap without dismantling the brake assembly;

brake shoes operating means separate from the brake shoes and disposed therebetweeen comprising a cooperating ring cylinder and ring piston, said cylinder and piston enclosing therebetween an annular space connected to a fluid conduit of a hydraulic system for extending said annular space, said ring cylinder being provided with two diametrically opposite disposed shoulders providing an abutment for said ring cylinder on said brackets, said annular space being sealed by sealing means comprising two sealing rings fitted in ring groves provided in the surfaces of the ring cylinder and the ring piston respectively, the operating means further comprising heat insulating rings attached to the ring cylinder and to the ring piston respectively and facing the opposite brake shoes, and means for automatic and infinitely, adjustment to cause a constant clearance between the brake shoes and the braking surfaces of the brake housing.

2. A brake assembly according to claim 1, wherein the means of automatic adjustment comprise a plate ring disposed between the ring cylinder and its insulating ring, circumferential spaced pins attached to said plate ring extending slidable through boreholes formed within the ring cylinder, a spring ring provided on said pins secured in a slit formed within the surface of said borehole, said spring rings causing the arrest of the rearward movement of the cylinder and piston relative to one another for maintaining a constant clearance between the linings of the brake shoes and the braking surfaces of the brake housing.

3. A brake assembly according to claim 1, wherein automatic adjustment is achieved by said sealing rings having a square form and by said ring groves being of a corresponding form.

4. In a brake assembly comprising
a brake housing comprising an annular member having an annular gap of channel-like cross-section open on its radially exterior side, the opposite inner sides of said channel-like gap providing annular braking surfaces, said brake housing being attachable to be rotatable jointly with a wheel of an assembly to be braked;
at least one pair of segmental brake shoes disposed from the radially exterior side into the channel-like gap having friction faces facing the adjacent braking surfaces, means for moving said brake shoes into contact with said braking surfaces and means for non-rotatably supporting each pair of brake shoes in the gap comprising a fixed support means which carries members disposed over the gap and pivotable from over said gap to uncover a portion of the gap whereby the brake shoes are insertable into the gap without dismantling the brake shoe moving means, the improvement wherein said means for moving the brake shoes into contact with said braking surfaces comprises a pair of annular actuating rings disposed between each pair of brake shoes and means for moving the actuating rings apart and against the brake shoes to press them against the braking surfaces comprising a pair of sliding ring members movable axially relative to each other and against said actuating rings, said annular members enclosing an annular fluid tight space therebetween, and means for introducing fluid under pressure into the said space.

5. The brake assembly of claim 4 wherein said brake shoes project outwardly from said gap and said actuating rings have flanges disposed against the brake shoes outside of the gap and said sliding ring members are disposed between the flanges, and means removably secured to said hub extends over the gap and supports the brake shoes in the gap.

6. The brake assembly of claim 5 wherein the said sliding members are L-shaped and the space between the said L-shaped members is sealed with O-rings.

7. In a brake assembly comprising
a brake housing comprising an annular member having an annular gap of channel-like cross-section open on its radially exterior side, the opposite inner sides of said channel-like gap providing annular braking surfaces, said brake housing being attachable to be rotatable jointly with a wheel of an assembly to be braked;
at least one pair of segmental brake shoes disposed from the radially exterior side into the channel-like gap having friction faces facing the adjacent braking surfaces, means for moving said brake shoes into contact with said braking surfaces and means for non-rotatably supporting each pair of brake shoes in the gap comprising a fixed support means which carries members disposed over the gap and pivotable from over said gap to uncover a portion of the gap whereby the brake shoes are insertable into the gap without dismantling the brake shoe moving means, the improvement wherein said means for moving the brake shoes into contact with said braking surface comprises brake shoes operating means separate from the brake shoes and disposed therebetween comprising a cooperating ring cylinder and ring piston, said cylinder and piston enclosing therebetween an annular space connected to a fluid conduit of a hydraulic system for extending said annular space, said ring cylinder being provided with two diametrically opposite disposed shoulders providing an abutment for said ring cylinder on said brackets, said annular space being sealed by sealing means comprising two sealing rings fitted in ring grooves provided in the surfaces of the ring cylinder and the ring piston, respectively.

* * * * *